(12) United States Patent
Causby et al.

(10) Patent No.: US 8,662,414 B2
(45) Date of Patent: Mar. 4, 2014

(54) WATERING DEVICE

(75) Inventors: Lyall Causby, Tennyson (AU); Robert Sigston, Macclesfield (AU); David Bevan Creed, Kingswood (AU)

(73) Assignee: Macronix International Co., Ltd., Hsinchu (TW)

( * ) Notice: Subject to any disclaimer, the term of this patent is extended or adjusted under 35 U.S.C. 154(b) by 506 days.

(21) Appl. No.: 13/061,477

(22) PCT Filed: Aug. 28, 2009

(86) PCT No.: PCT/AU2009/001124
§ 371 (c)(1),
(2), (4) Date: Apr. 15, 2011

(87) PCT Pub. No.: WO2010/022471
PCT Pub. Date: Mar. 4, 2010

(65) Prior Publication Data
US 2011/0192916 A1    Aug. 11, 2011

(30) Foreign Application Priority Data

Aug. 28, 2008  (AU) ................................. 2008904437

(51) Int. Cl.
*B05B 15/00*    (2006.01)
*B65H 75/00*    (2006.01)

(52) U.S. Cl.
USPC ............ 239/201; 239/196; 239/542; 137/859

(58) Field of Classification Search
USPC ......... 239/200, 542, 201, 196, 195, 276, 279; 137/859
See application file for complete search history.

(56) References Cited

U.S. PATENT DOCUMENTS

| 3,777,980 A | 12/1973 | Allport |
| 3,882,892 A * | 5/1975 | Menzel ...................... 137/513.3 |
| 3,979,070 A * | 9/1976 | Lemelshtrich ................ 239/542 |
| 4,105,162 A | 8/1978 | Drori |
| 4,196,753 A | 4/1980 | Hammarstedt |

(Continued)

FOREIGN PATENT DOCUMENTS

| EP | 0138636 A1 | 4/1985 |
| FR | 2334422 A1 | 7/1977 |
| WO | 9529761 A1 | 11/1995 |
| WO | 2007074428 A1 | 7/2007 |

OTHER PUBLICATIONS

International Search Report and Written Opinion from corresponding International application No. PCT/AU2009/001124; mailed Nov. 18, 2009; 8 pages.

(Continued)

*Primary Examiner* — Len Tran
(74) *Attorney, Agent, or Firm* — James F. Hann; Haynes Beffel & Wolfeld LLP

(57) ABSTRACT

A watering device includes a main body having a main inlet for receiving pressurized water and an intermediate cap member in fluid communication and sealingly engaged with the main body. The watering device also includes a top cap member sealingly engaged with the intermediate cap member. The top cap member includes at least one watering outlet. The watering device also includes a diaphragm substantially covering a base portion of the intermediate cap member and arranged to interact with water flowing from the main body to divert water to function as a pressure compensator for substantially maintaining the flow rate of the watering device.

9 Claims, 5 Drawing Sheets

(56) References Cited

U.S. PATENT DOCUMENTS

| | | | |
|---|---|---|---|
| 4,392,616 A | * | 7/1983 | Olson .................... 239/271 |
| 4,428,397 A | | 1/1984 | Bron |
| 4,460,129 A | * | 7/1984 | Olson .................... 239/542 |
| 5,413,282 A | | 5/1995 | Boswell |
| 5,711,482 A | | 1/1998 | Yu |
| 6,027,048 A | * | 2/2000 | Mehoudar .................... 239/542 |

OTHER PUBLICATIONS

May 28, 2013 Examination Report of related application AU 2009287348, 4pp.

\* cited by examiner

WATERING DEVICE

CLAIM OF PRIORITY

The present application for patent claims priority from Australian Provisional Patent Application No. 2008904437 entitled "WATERING DEVICE", filed 28 Aug. 2008, which is hereby expressly incorporated by reference herein in its entirety.

TECHNICAL FIELD

The present invention relates to a watering device suitable for incorporation into irrigation systems. In a particular form the present invention relates to a multiple outlet miniature watering device suitable for incorporation into domestic style irrigation systems.

BACKGROUND

Miniature watering devices such as dripper or spray units are used extensively for the application of water to plants. Typically, these devices will be attached or inserted into a common hose or pipe and deliver water according to a preset flow rate or in some cases the devices may be adjustable. As the water pressure being delivered to the watering device will often vary, many of these devices will include a pressure compensating capability which attempts to provide a uniform output flow rate of water from the device irrespective of the input pressure of water being fed to the watering device.

Often this pressure compensating capability only functions over a relatively narrow range of input water pressure. If mains or input water pressure increases unexpectedly outside of this range, the pressure compensating capability of the watering device is overwhelmed causing the watering device to fail. For miniature watering devices having multiple outlets the required input pressure will already be high, thereby exacerbating this effect. Accordingly, in many cases a further flow or pressure regulator must be incorporated into the irrigation system.

Flow or pressure regulators are devices that aim to deliver constant outlet pressure under varying input flow conditions over a range of input flow rates. However, as a pressure regulator in itself only functions over a limited range of flow rates, the output capacity of the watering devices will also need to be matched with the capacity of the pressure regulator. As a consequence, any change in the irrigation system will need to take into account the capacity of the pressure regulator. This adds extra complexity to this task, particularly in the context of a domestic irrigation system where a person not having any specialised training will be carrying out the modifications. Furthermore, the incorporation of a pressure regulator in an irrigation system adds extra expense and another point of potential failure which may occur either in the device itself or in the related extra joints and fittings required to incorporate the pressure regulator into the irrigation system. There is therefore a need for a watering device that is capable of performing under an increased range of inlet water pressures.

SUMMARY

In a first aspect the present invention accordingly provides a watering device including:
- a main body including a main inlet for receiving pressurized water;
- an intermediate cap member in fluid communication and sealingly engaged with the main body, the intermediate cap member including a base portion including at least one channel formed in the base portion and extending between a periphery of the base portion to an inlet of a central bore extending from the base portion and through the intermediate cap member;
- a top cap member sealingly engaged with the intermediate cap member and in fluid communication with an outlet of the central bore, the cap member including at least one watering outlet;
- a diaphragm substantially covering the base portion of the intermediate cap member, the diaphragm arranged to interact with water flowing from the main inlet of the main body of the watering device to divert water to flow through the at least one channel to the inlet of the central bore and in combination with the at least one channel to function as a pressure compensator for substantially maintaining the flow rate of the watering device by modifying the effective size of the at least one channel depending on inlet water pressure, wherein the at least one channel includes a channel compensation arrangement to compensate for the behaviour of the diaphragm at different inlet water pressures to increase the range of inlet water pressures over which the pressure compensator substantially maintains the flow rate of the watering device.

In another form, the channel compensation arrangement includes a channel profile that progressively resists the movement of the diaphragm into the at least one channel with increasing water pressure.

In another form, a cross sectional profile of the channel profile includes at least one tapered portion.

In another form, the cross sectional profile includes a lower portion having a generally symmetrical trapezoidal profile.

In another form, a depth profile of the channel profile varies along the at least one channel.

In another form, the channel profile varies along the at least one channel to create a venturi effect acting to suck the diaphragm into the channel.

In another form, the inlet of the central bore of the cap member includes a barrier arrangement to substantially prevent the diaphragm from collapsing into the inlet of central bore.

In another form, the barrier arrangement includes at least one inwardly extending projection, extending from the periphery of the inlet.

In another form, the cap member includes a chamber located to receive water exiting the outlet of the central bore, the chamber functioning as a sink region to moderate the flow of water exiting the central bore.

BRIEF DESCRIPTION OF THE DRAWINGS

An illustrative embodiment of the present invention will be discussed with reference to the accompanying drawings wherein.

In the following description, like reference characters designate like or corresponding parts throughout the several views of the drawings.

DETAILED DESCRIPTION

Figure 1:
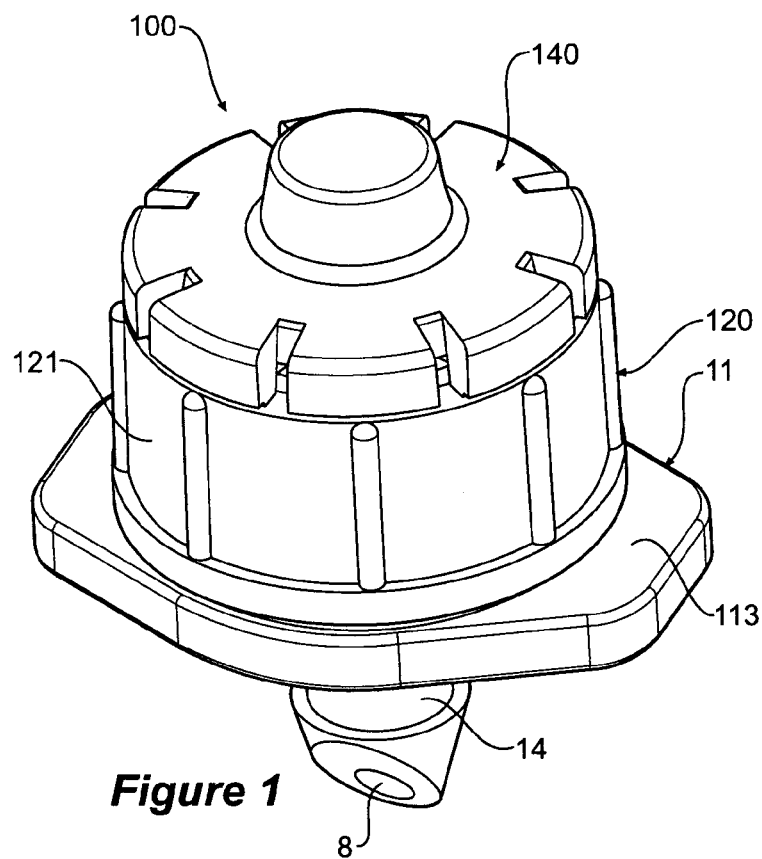
FIG. 1 is a top perspective view of a miniature watering device in accordance with a first illustrative embodiment of the present invention.
Figure 2:
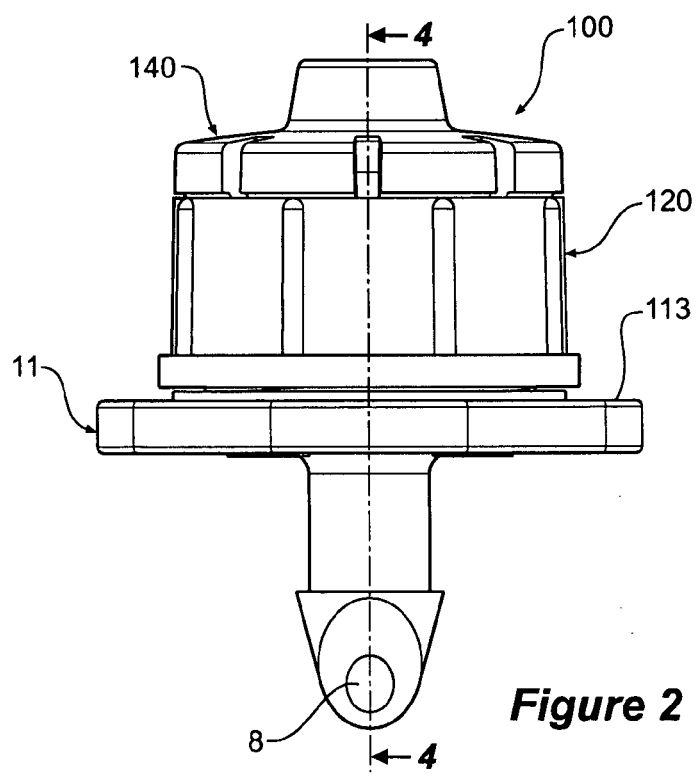
FIG. 2 is a front view of the miniature watering device illustrated in FIG. 1.

Referring now to FIGS. 1 to 5, there are shown a series of views of a miniature watering device 100 in accordance with an illustrative embodiment of the present invention. As would be apparent to those skilled in the art, the present invention will have numerous applications, however for the purposes of description only the invention will be described in relation to one application, namely its use in relation to a miniature watering device suitable for either domestic or commercial scale irrigation systems.

Miniature watering device 100 includes an integrally moulded main body 11 formed in this illustrative embodiment of polypropylene plastic which rotatably supports an integrally moulded intermediate cap member 120 to which an integrally moulded top cap member 140 is attached to. As would be apparent to those skilled in the art any other suitable rigid water impermeable material may be used.

The body 11 comprises a base flange 113 from which centrally extends a main inlet in the form of inlet spigot 14 which is adapted to be inserted and sealingly engaged in an aperture in the wall of a hose or pipe (not shown). The body 11 is further formed with a cylindrical wall 115 which extends upwardly from the base flange 113 and has a screw threaded outer surface 112. Cylindrical wall 115 forms a cylindrical through bore 116 in fluid communication with an inlet passageway 8 extending through the inlet spigot 14 and base flange 113.

Figure 3:
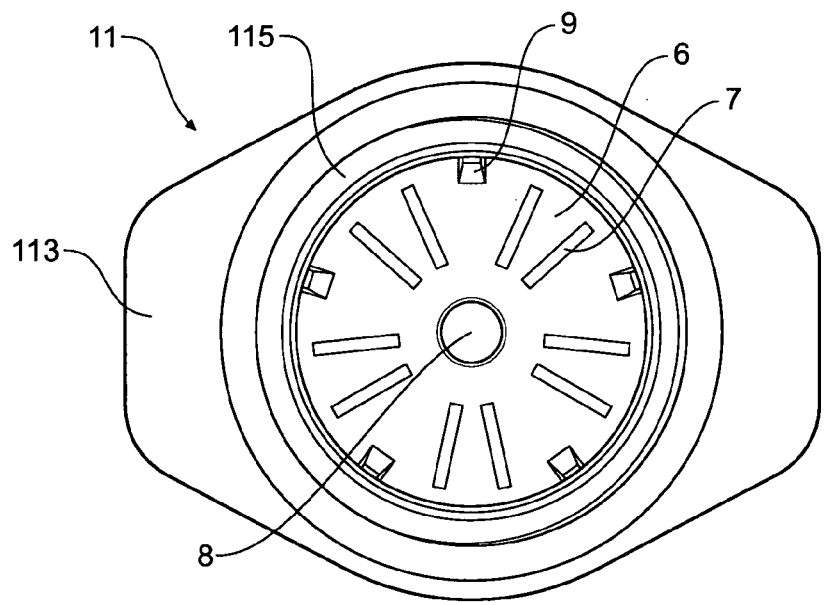
FIG. 3 is a top view of the main body of the miniature watering device illustrated in FIG. 1.

As best seen in FIG. 3, located around the base of cylindrical wall 115 are equally radially spaced guide or location members 9 which function to centrally locate flexible diaphragm 185 within cylindrical wall 115. The floor 6 of cylindrical wall 115 which itself forms part of the base flange 113 includes a series of radially extending support members 7 which function to raise flexible diaphragm above the level of floor 6.

Intermediate cap member 120 includes a cylindrical outer wall or skirt portion 121 connected at the top to an inner cylindrical wall 124 which extends downwardly with a slight inward taper and is connected at its base to a central disc region 126, thereby forming a circumferential receiving channel 127 to receive the cylindrical wall 115 of body 11. Skirt portion 121 includes a screw threaded inner surface 122 for screwing onto screw threaded outer surface 112 of cylindrical wall 115 of the body 11. As would be apparent to one of ordinary skill in the art, the intermediate cap member 120 may be attached to the body 11 by any suitable attachment means such as press fitting, sonic welding or the like. Central disc region 126 includes a circular shaped base portion 130 which in this illustrative embodiment is concave or dish shaped.

Extending centrally and upwardly from central disc region 126 is a spout or nozzle 128 including a central bore 129 extending through to the base portion 130 of central disc region 126. Between the inner cylindrical wall 124 and nozzle 128 there is formed a stepped circumferential cavity region 123 having a shoulder 123a defining a lower region 123b of reduced diameter.

Figure 4:
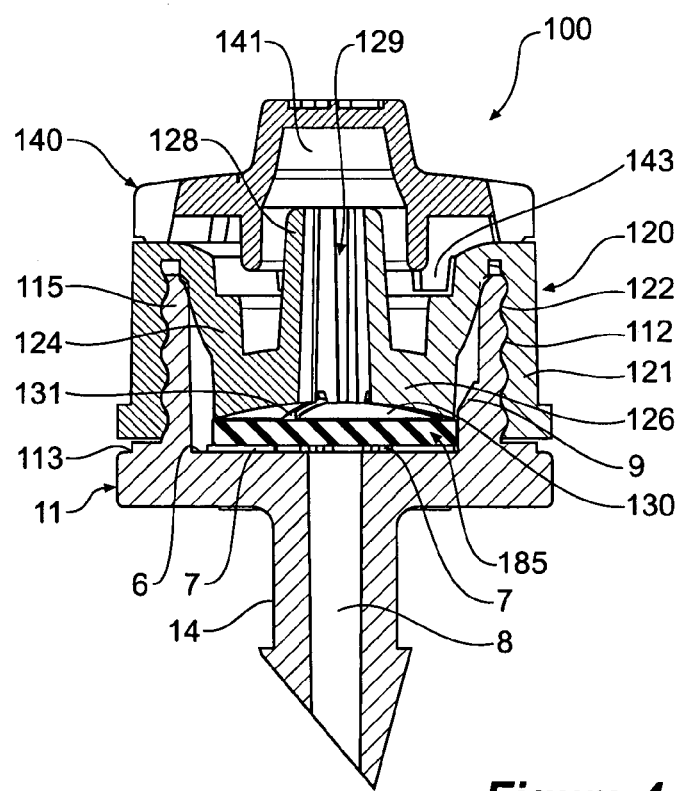
FIG. 4 is a side sectional view through 4-4 of the miniature watering device illustrated in FIG. 2.

Top cap member 140 is generally disc shaped and includes a central inner reservoir or chamber 141 located within upwardly extending projection 142 and which when attached to intermediate cap member 120 is located over the outlet 129b of nozzle 128 (as best seen in FIG. 4). Extending downwardly from top cap member 140 is a number of radially spaced location tabs 143 which locate onto the shoulder 123a of circumferential cavity region 123 to facilitate positive location and eventual attachment of top cap member 140 to intermediate cap member 120. In this illustrative embodiment, sonic welding is employed for the attachment process but equally other attachment techniques known in the art may be used. Located about the periphery of top cap member 140 are eight watering outlets 144 in fluid communication with central chamber 141 and located within corresponding inwardly extending channels 145 which function to direct the flow of water exiting each watering outlet 144.

Figure 5:
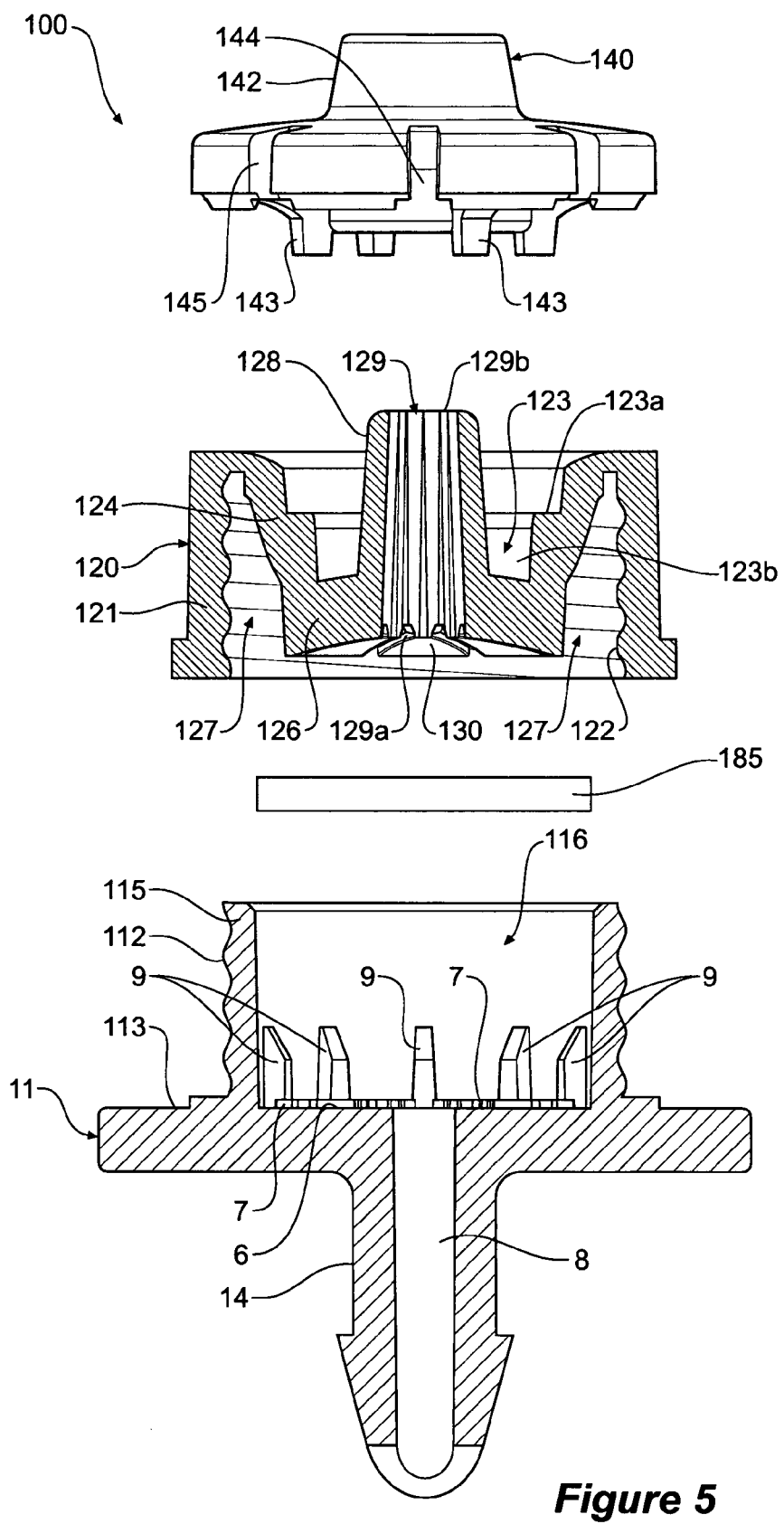
FIG. 5 is an exploded part sectional view of the miniature watering device illustrated in FIG. 2 in a sectional plane perpendicular to that of FIG. 4.
Figure 6:
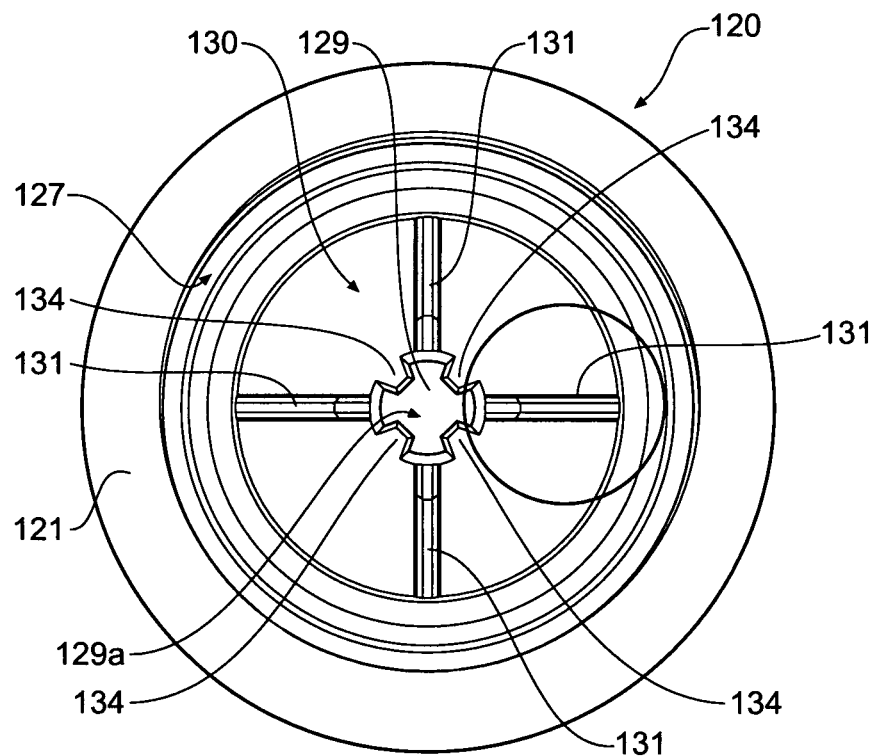
FIG. 6 is a an underside view of the intermediate cap member illustrated in FIG. 4.
Figure 8:
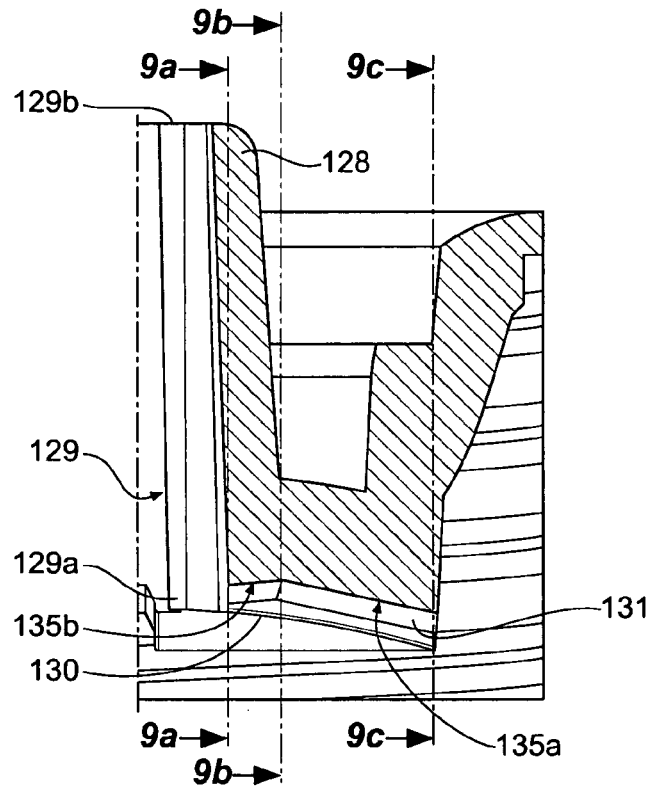
FIG. 8 is a side sectional view through 8-8 of the inwardly extending channel illustrated in FIG. 7 depicting the depth profile.
Figure 9A:
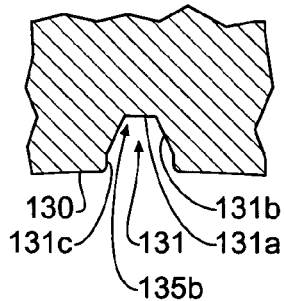
FIGS. 9a to 9c are a series of end on sectional views through 9a-9a, 9b-9b and 9c-9c of FIG. 8 respectively depicting the channel profile of the inwardly extending channel illustrated in FIG. 7.
Figure 9B:
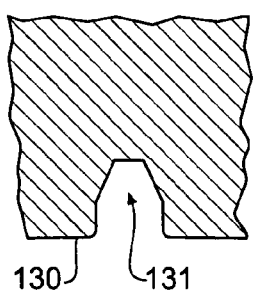
Figure 9C:
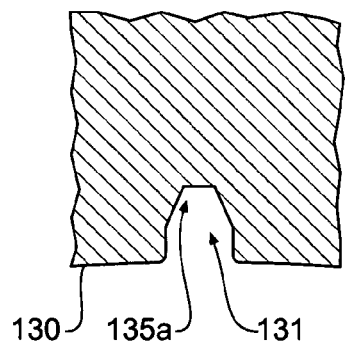

Referring now to FIG. 6, there is shown an underside view of the intermediate cap member 120 showing base portion 130 of central disc region 126 clearly depicting in this illustrative arrangement the four inwardly extending radial grooves or channels 131 spaced at right angles to each other. Channels 131 are formed into base portion 130 and extend from the periphery of base portion 130 to the inlet 129a of central bore 129 of nozzle 128. In this illustrative embodiment, each channel 131 varies in channel profile in relation to both depth (as best seen in FIG. 8) and cross sectional shape (as best seen in FIGS. 9a to 9c). As can be seen in FIG. 5, central bore 129 has a non-regular cross sectional profile having four inwardly extending projections 134 spaced at right angles to each other and located alternately to the four channels 131. Projections 134 are formed in the wall of central bore 129 resulting in a generally cross-shaped sectional profile.

In operation, water flowing upwardly through inlet passageway 8 will force diaphragm 185 to sit within dish shaped or concave base portion 130 of intermediate cap member 120 diverting water to flow through the gap between the outer edge of the diaphragm 185 and the cylindrical wall 115 of body 11. As the top of cylindrical wall 115 is sealed against the top of receiving channel 126 of the intermediate cap member 120 the water will then flow inwardly through channels 131 and then through central bore 129 exiting into central chamber 141 which functions as a sink region to moderate or dampen the water flow with the water eventually exiting miniature water device 100 by watering outlets 144.

In normal operation, as the inlet water pressure is increased the combination of diaphragm 185 and channels 131 functions as a pressure compensator or pressure compensating means to maintain the flow rate of water exiting central bore 129 of nozzle 128 as the diaphragm 185 will be forced into channels 131, thereby acting to reduce the effective size of the channel 131. This has the effect of maintaining the flow rate of water able to travel through each channel 131 at the increased pressure.

In accordance with the present invention, the channel profile of each channel 131 includes a channel compensation arrangement to increase the pressure range over which the pressure compensator or pressure compensating means will function by compensating for the behaviour 185 of the diaphragm at different inlet water pressures.

Figure 7:
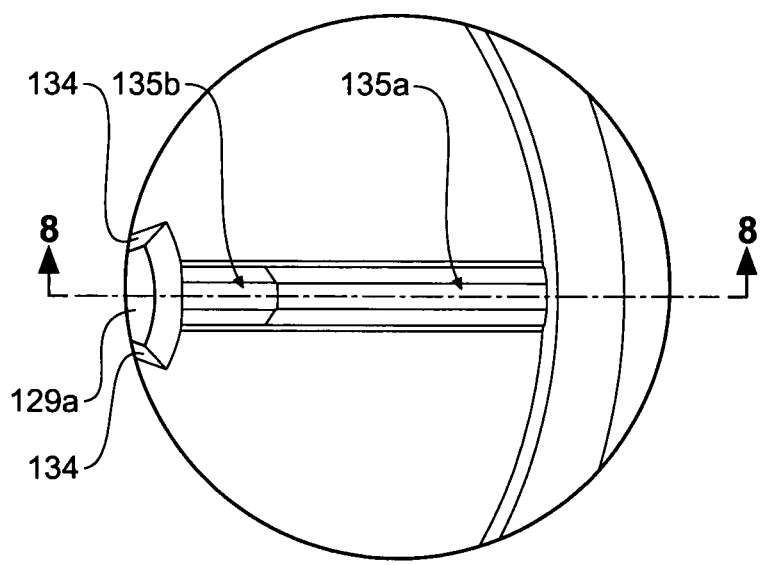
FIG. 7 is a detailed view of the intermediate cap member as illustrated in FIG. 6 depicting one of the inwardly extending channels.

Referring now to FIG. 8 and FIGS. 9a to 9c, there are shown detailed side and end on sectional views of channel 131. In this illustrative embodiment, and as can be best seen in FIG. 7, travelling from the periphery of base portion 130 to the inlet 129a of central bore 129 the channel 131 is maintained at a constant depth for a first channel region 135a and then reduced in a second channel region 135b approaching the inlet 129a of central bore 129. The general cross sectional profile includes a narrow floor portion 131a from which extend opposed flared or outwardly tapered wall portions 131b forming a symmetrical trapezoidal profile which further extend downwardly (in this orientation) into corresponding vertical wall portions 131c. In this illustrative embodiment, in order to vary the depth profile as referred to above, the length of the vertical wall portions 131c are shortened as can be seen by comparing the channel profile between FIG. 9c at the periphery of base portion and FIG. 9a at the inlet 129a to central bore 129.

As the inlet pressure increases, the diaphragm 185 will be pushed deeper into each channel 131 eventually encountering the tapered wall portions 131b which function to progressively resist the further movement of diaphragm 185 into channel 130 due to the reduction in the amount of volume that is able to be occupied by diaphragm 185. In this manner, the flow of water through channel 131 is maintained at increased pressures where otherwise the diaphragm 185 would collapse and close channel 131 for a standard rectangular profile. In addition, as the depth profile varies from the beginning of second channel region 135b at inlet 129a of central bore 129 (as seen in FIG. 9a) to the beginning of first channel region 135a (as seen in FIG. 9b), the cross sectional area of channel 131 increases, thereby causing a venturi effect which results in a pressure drop over this region which functions to suck the diaphragm 185 into channel 131.

This sucking effect brings the diaphragm 185 into contact with the tapered wall portions 131b which as described above will progressively modify the behaviour of diaphragm 185 instead of allowing the diaphragm to collapse inwardly and close off channel 131. In this manner, the modification of the depth profile of channel 131 facilitates the operation of the modified channel profile. As would be apparent to those skilled in the art, this effect could be achieved by generally varying the channel profile along the length to create regions having different cross sectional areas.

In this illustrative embodiment, inwardly extending projections 134 that extend towards the centre of central bore 129 from the periphery of inlet 129a and which are located on each side of channel 130 also function as a barrier arrangement or means to prevent diaphragm 185 from collapsing into inlet 129a at elevated pressures. Although in this illustrative embodiment, symmetrical tapered wall portions 131b of varying cross sectional size have been employed it would be apparent to one of ordinary skill in the art that any channel profile that has been adapted to compensate for the varying characteristics or behaviour of the diaphragm 185 at different inlet water pressures is contemplated to be within the scope of the invention. Accordingly, the channel profile may have different cross sectional and/or depth profiles, which in themselves may vary at different locations along the channel. This will depend on factors, including but not limited to, the type of diaphragm being used, the number of channels, the number of outlets and the range of inlet pressures.

A brief consideration of the above described embodiment will indicate that the invention provides a vastly improved watering device which is able to operate to provide a substantially constant flow rate over an increased inlet pressure range. In the example of a miniature watering device as described herein, the applicant has found that the upper input pressure limit of the device has been extended from 400 kPa to approximately 700 kPa providing a significant advance over prior art devices.

The reference to any prior art in this specification is not, and should not be taken as, an acknowledgement of any form of suggestion that such prior art forms part of the common general knowledge.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

Although an illustrative embodiment of the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A watering device including:
   a main body including a main inlet for receiving pressurized water;
   an intermediate cap member in fluid communication and sealingly engaged with the main body, the intermediate cap member including a base portion including at least one channel formed in the base portion and extending between a periphery of the base portion to an inlet of a central bore extending from the base portion and through the intermediate cap member;
   a top cap member sealingly engaged with the intermediate cap member and in fluid communication with an outlet of the central bore, the cap member including at least one watering outlet;
   a diaphragm substantially covering the base portion of the intermediate cap member, located between the intermediate cap and the main body, the diaphragm arranged to interact with water flowing from the main inlet of the main body of the watering device to divert water to flow through the at least one channel to the inlet of the central bore and in combination with the at least one channel to function as a pressure compensator for substantially maintaining the flow rate of the watering device by modifying the effective size of the at least one channel depending on inlet water pressure, wherein the at least one channel includes a channel compensation arrangement to compensate for the behavior of the diaphragm at different inlet water pressures to increase the range of inlet water pressures over which the pressure compensator substantially maintains the flow rate of the watering device.

2. A watering device as claimed in claim 1, wherein the channel compensation arrangement includes a channel profile that progressively resists the movement of the diaphragm into the at least one channel with increasing water pressure.

3. A watering device as claimed in claim 2, wherein a cross sectional profile of the channel profile includes at least one tapered portion.

4. A watering device as claimed in claim 3, the cross sectional profile includes a lower portion having a generally symmetrical trapezoidal profile.

5. A watering device as claimed in claim 2, wherein a depth profile of the channel profile varies along the at least one channel.

6. A watering device as claimed in claim 2, wherein the channel profile varies along the at least one channel to create a venturi effect acting to suck the diaphragm into the channel.

7. A watering device as claimed in claim 1, wherein the inlet of the central bore of the cap member includes a barrier arrangement to substantially prevent the diaphragm from collapsing into the inlet of central bore.

8. A watering device as claimed in claim 7, wherein the barrier arrangement includes at least one inwardly extending projection, extending from the periphery of the inlet.

9. A watering device as claimed claim 1, wherein the cap member includes a chamber located to receive water exiting the outlet of the central bore, the chamber functioning as a sink region to moderate the flow of water exiting the central bore.

\* \* \* \* \*

UNITED STATES PATENT AND TRADEMARK OFFICE
CERTIFICATE OF CORRECTION

PATENT NO. : 8,662,414 B2
APPLICATION NO. : 13/061477
DATED : March 4, 2014
INVENTOR(S) : Lyall Causby et al.

It is certified that error appears in the above-identified patent and that said Letters Patent is hereby corrected as shown below:

In the Claims

In claim 1, column 6, line 39, insert the word -- top -- before the word "cap".

In claim 1, column 6, line 40, insert the word -- and -- after "outlet;".

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,662,414 B2
APPLICATION NO. : 13/061477
DATED : March 4, 2014
INVENTOR(S) : Lyall Causby et al.

It is certified that error appears in the above-identified patent and that said Letters Patent is hereby corrected as shown below:

Title page, delete at (73) Assignee:

"Macronix International Co., Ltd., Hsinchu, (TW)"

Title page, insert at (73) Assignee:

-- Antelco Pty Ltd, Murray Bridge, South Australia (AU) --

Signed and Sealed this
Second Day of February, 2016

Michelle K. Lee
*Director of the United States Patent and Trademark Office*